(12) United States Patent
Amiel et al.

(10) Patent No.: US 7,710,449 B2
(45) Date of Patent: May 4, 2010

(54) METHOD FOR REAL-TIME BROADCASTING OF MULTIMEDIA FILES DURING A VIDEO CONFERENCE, WITHOUT INTERRUPTING COMMUNICATION, AND A MAN-MACHINE INTERFACE THEREFOR

(75) Inventors: Jean-Christophe Amiel, Paris (FR); Patrick Boissonade, Mesnil Saint-Denis (FR); Patrick Monfort, Pau (FR)

(73) Assignee: France Telecom, Paris (FR)

( * ) Notice: Subject to any disclaimer, the term of this patent is extended or adjusted under 35 U.S.C. 154(b) by 822 days.

(21) Appl. No.: 10/524,365

(22) PCT Filed: Jul. 28, 2003

(86) PCT No.: PCT/FR03/02365

§ 371 (c)(1),
(2), (4) Date: Aug. 23, 2005

(87) PCT Pub. No.: WO2004/017636

PCT Pub. Date: Feb. 26, 2004

(65) Prior Publication Data

US 2006/0152575 A1    Jul. 13, 2006

(30) Foreign Application Priority Data

Aug. 12, 2002   (FR) .................................. 02 10241

(51) Int. Cl.
*H04N 7/14*   (2006.01)

(52) U.S. Cl. ................................. 348/14.08; 455/556.1

(58) Field of Classification Search ... 348/14.01–14.12; 375/240.26; 379/93.21, 93.08, 93.17
See application file for complete search history.

(56) References Cited

U.S. PATENT DOCUMENTS

| | | | | |
|---|---|---|---|---|
| 5,515,099 A | * | 5/1996 | Cortjens et al. | 348/14.1 |
| 5,668,738 A | * | 9/1997 | Ataras, III | 348/14.12 |
| 6,529,231 B1 | * | 3/2003 | Yoshida | 348/14.08 |
| 6,593,955 B1 | * | 7/2003 | Falcon | 348/14.01 |
| 6,792,048 B1 | * | 9/2004 | Lee et al. | 375/240.26 |
| 6,850,266 B1 | * | 2/2005 | Trinca | 348/14.09 |
| 6,906,741 B2 | * | 6/2005 | Canova et al. | 348/14.08 |

OTHER PUBLICATIONS

Tina Wong & al., "Software-only video production switcher for the Internet Mbone", 1998, pp. 28-39.

* cited by examiner

*Primary Examiner*—Curtis Kuntz
*Assistant Examiner*—Maria El-Zoobi
(74) *Attorney, Agent, or Firm*—Oblon, Spivak, McClelland, Maier & Neustadt, L.L.P.

(57) ABSTRACT

The invention concerns a method of broadcasting data files, in particular multimedia files, during a video conference using a sending terminal and a man/machine interface located in the said terminal. According to the method proposed, the broadcasting of the files is effected in real time with a current video conference communication, without breaking this communication, using the audio and video channels open for this communication, a participant being able, using the said terminal, by means of a simple selection of the file appearing on his screen and movement of this, to activate the launch of the broadcasting of the file to be broadcast.

12 Claims, 5 Drawing Sheets

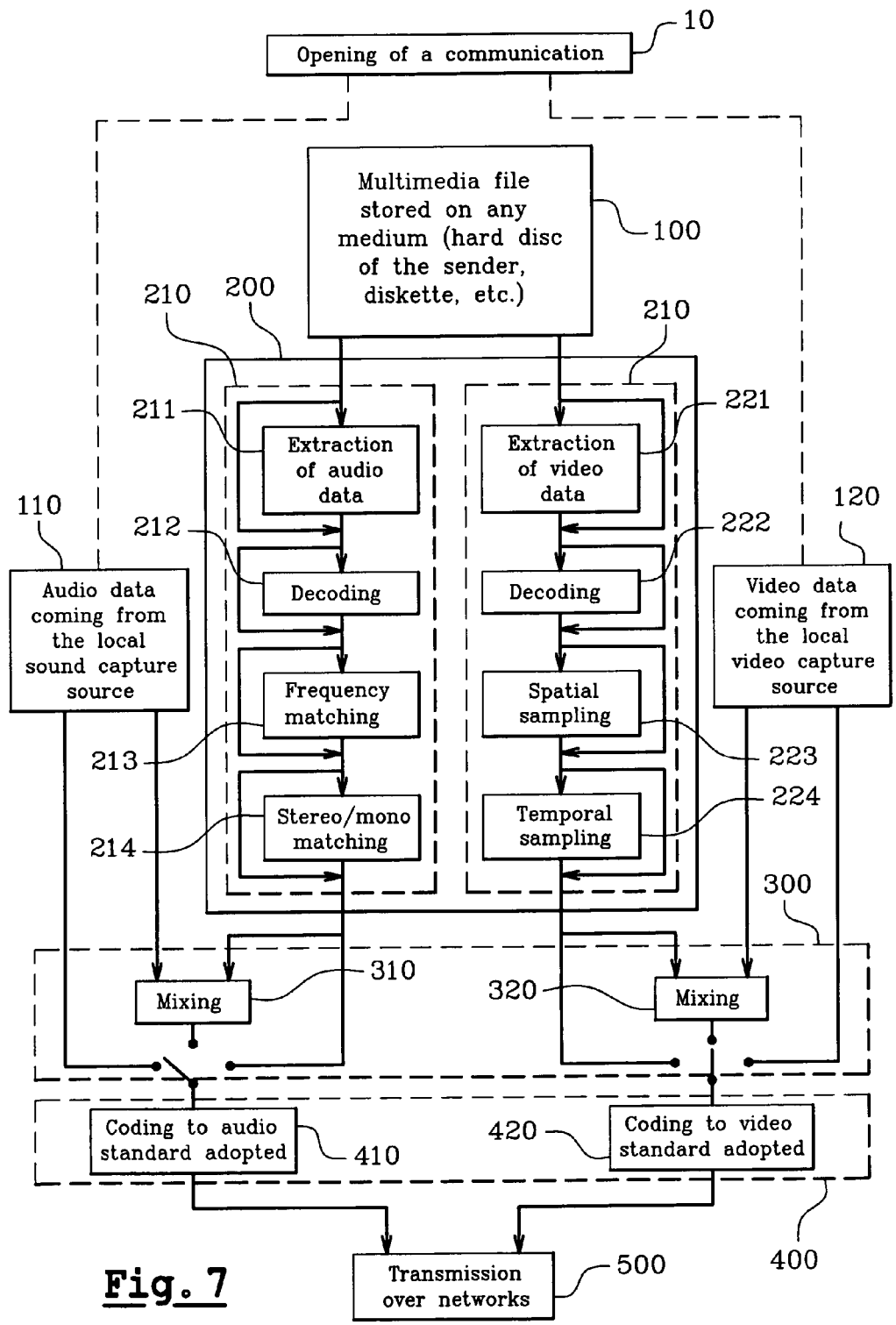

METHOD FOR REAL-TIME BROADCASTING OF MULTIMEDIA FILES DURING A VIDEO CONFERENCE, WITHOUT INTERRUPTING COMMUNICATION, AND A MAN-MACHINE INTERFACE THEREFOR

CROSS-REFERENCE TO RELATED APPLICATIONS

The present application is a U.S. national stage entry under 35 U.S.C. 371, of International Application No. PCT/FR2003/002365, filed Jul. 28, 2003. Priority is claimed from French Patent Application No. 02/10241, filed Aug. 12, 2002, the content of which is herein incorporated by reference.

BACKGROUND OF THE INVENTION

1. Field of the Invention

The invention concerns a method of real-time broadcasting of multimedia files during a video conference, without breaking communication, and a man-machine interface for implementing the said method.

2. Description of the Related Art

To conduct a video conference, use is made of a video conference terminal conventionally consisting of computer equipment, dedicated or not. It may therefore be a case of a computer of the PC type equipped with video conference functions. The computer is then coupled to audio and video signal capture sources (camera, microphones). The computer is also equipped with software for processing the signals captured and processing the signals received, means of connection to a telecommunication network and a man/machine interface for displaying on the screen a so-called "local" window and at least one so-called "distant" window.

In the remainder of the description a video conference terminal will be spoken of in order to designate any terminal equipped with means for establishing video conference communications through a telecommunication network with one or more other video conference terminals.

During a video conference, a participant, having a video conference terminal, may wish to broadcast in real time a data file, in particular a multimedia file, to his fellow participants. Broadcasting is spoken of to designate the fact that the receiver never has the broadcast file available to it.

The sending participant is hereinafter designated as the "sender". The multimedia files are for example video files which the participant has recorded and which he wishes to comment on, musical extracts, or any other multimedia file that the terminal can use. These files are, for example, videos to the MPEG-1 format or music to the MP3 format.

One solution currently adopted in video conference terminals consists of transmitting the multimedia file in its entirety to the participant through a data channel separate from the audio and video channels of the communication. The participants then receive the file as it exists on the computer of the sender.

This solution raises several problems:

A first problem stems from the fact that the operation does not truly take place in real time with the current communication, the transmission time depends on the size of the file and the bandwidth available on the separate channel used.

In addition, the sender is obliged to perform several operations and manipulations which are not very economic, the consequence of which is to momentarily break the communication.

Moreover, there is a risk of the receivers not having available equipment capable of using these files (for example: the sender wishes to send a video coded with the MPEG-1 standard to the receiver, the receiver does not have an MPEG-1 decoder and therefore he cannot decode the file).

And finally, the sender makes his multimedia file available to his receivers, which he would wish to be able to prevent.

To summarise, this solution amongst other things poses problems of real time, economics, breakage of communication and security of operation.

Another solution is afforded by standards of the T.120 type. According to these standards, it is possible to effect a sharing of applications between video conference participants.

The sender has for this purpose a list of primitives enabling him to transmit the events which he generates, 2D images or screen captures of the video conference terminal which he is using. However, the sender does not have the possibility of controlling the bandwidth which he uses and does not have the possibility of transmitting audio data.

In addition, if the receiver is not able to support the document sharing standards, the broadcasting of a multimedia file is impossible.

SUMMARY OF THE INVENTION

For the purpose of resolving these problems, the invention proposes a method of broadcasting data files, in particular multimedia files, during a video conference using a sending terminal able to establish a communication with one or more receiving terminals, these terminals being equipped with audio and video sources, principally characterised in that the broadcasting of the files is carried out in real time with the current video conference communication, without breaking this communication, using the audio and video channels open for this communication.

The method also comprises a step implemented when the video conference communication is established, consisting of a dialogue between the sending terminal and the receiving terminal or terminals in order to negotiate one or more communication parameters and compliance during the broadcasting of a multimedia file with the constraints fixed for the said audio and video channels and those of the receiving terminal or terminals.

A first parameter negotiated is the bandwidth allocated for the audio and video channels of the video conference communication, the multimedia files being broadcast in compliance with this negotiated bandwidth.

A second parameter consists of the frequencies of the audio and video streams of the streams captured by the audio and video sources, the multimedia files being broadcast in compliance with these frequencies.

A third parameter is the frame size of the images broadcast, the resulting images issuing from the video sources and from a multimedia file complying with the negotiated size.

A fourth parameter is the coding standard of the bit streams of the audio and video sources, the bit streams of a multimedia file being coded with the codecs (coding-decoding algorithm) negotiated.

According to another characteristic, the video of a multimedia file to be broadcast is decoded and mixed in real time with the video issuing from the video capture source of the sending terminal and then coded according to the video coding standard negotiated.

According to another characteristic, the audio data of a multimedia file to be broadcast are decoded and mixed in real time with the audio data issuing from the audio capture source of the sending terminal and then coded with the audio standard negotiated.

Advantageously, the broadcasting is implemented by a program whose execution is launched by means of a man/machine interface implemented in the sending terminal.

The invention also concerns a man/machine interface for a terminal equipped with means for effecting video conference communications and input-output peripherals, the said interface comprising graphical representation means for displaying several windows, one of which is said to be "local" for displaying during a video conference communication a local video image broadcast to one or more distant terminals and at least one second so-called "distant" window for displaying at least one video image issuing from a distant terminal, principally characterised in that the graphical representation means also make it possible to display at least one other window in order to reveal, in the form of icons for example, data files, in particular multimedia files, available from the terminal, the said interface also comprising a logic module providing coupling between the operations of selecting a file and of movement in the "distant" window and the launch by the video conference means of a program for broadcasting the said file in real time with the current video conference communication, without breaking this communication, using the audio and video channels open for this communication.

According to another characteristic, the interface is implemented by a computer program launched by the video conference means.

The invention also concerns a computer terminal comprising means of running a video conference, principally characterised in that it comprises a man/machine interface as described above.

Other particularities and advantages of the invention will emerge clearly from a reading of the description made below which is given by way of non-limiting example and with regard to the accompanying drawings, in which:

DESCRIPTION OF THE DRAWINGS

FIG. 7 depicts the broadcast algorithm implemented according to the method by the video conference terminal TA.

DESCRIPTION OF THE INVENTION

The invention concerns in general terms a method of broadcasting a data file during a video conference. It applies particularly to the broadcast of multimedia files during a video conference from a video conference terminal, this example being taken for the remainder of the description.

Figure 1:
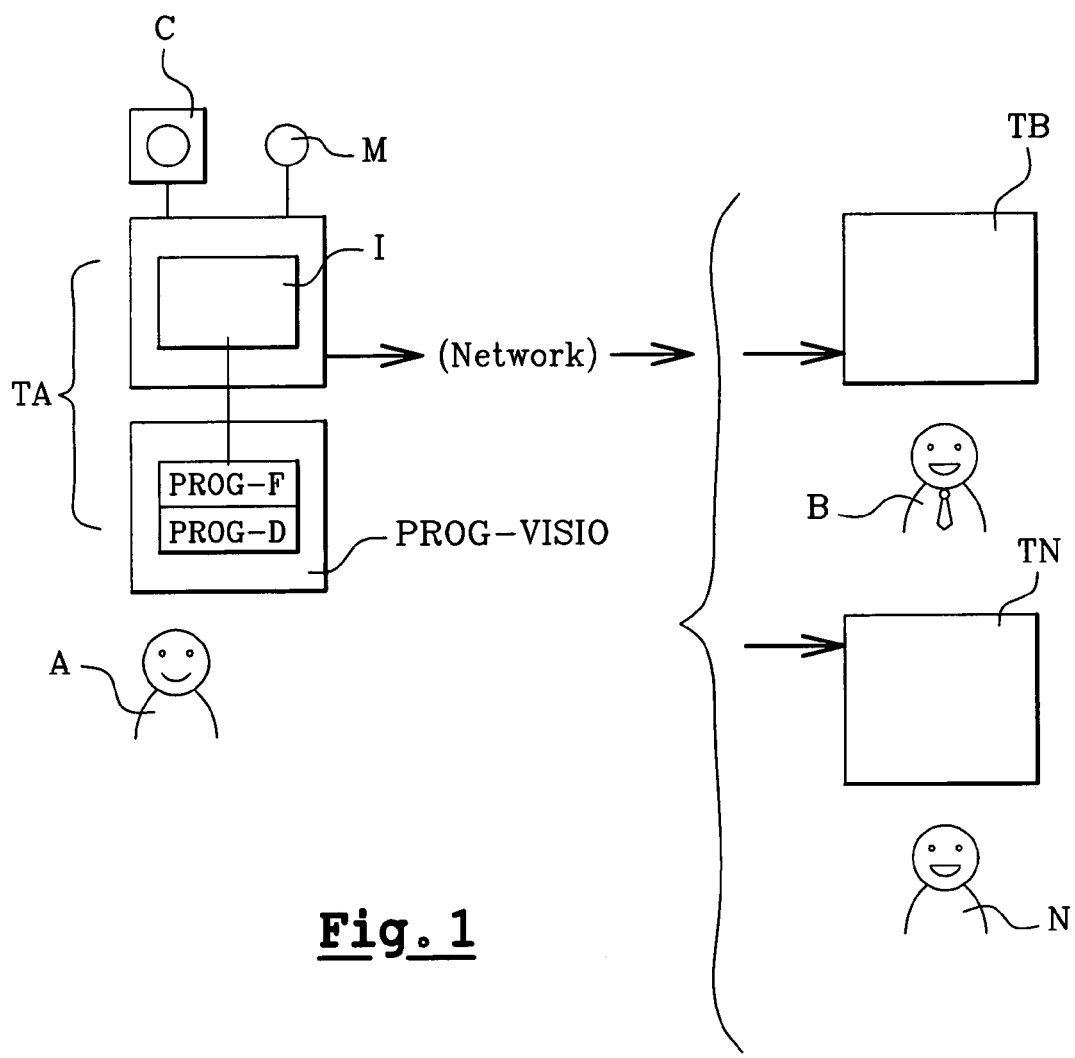
FIG. 1 depicts the diagram of a video conference system between a plurality of video conference terminals.

As will be seen in more detail hereinafter in relation to FIG. 1, the terminal TA of the sender A is equipped with means of implementing the method according to the invention. These means make it possible to broadcast a multimedia file in real time with a current video conference communication, without breaking this communication, using the audio and video channels open for this communication. These means are coupled with a man/machine interface I which enables the sender to perform a very simple operation for broadcasting the required file.

In the description given below and for the purpose of simplifying the disclosure, a video conference between two participants A and B is described, during which one of the participants A (the sender) will broadcast a multimedia file. Naturally the invention is not limited to this case and can easily be transposed to scenarios involving several participants.

Consequently the example has been taken of participants A and B, equipped with video conference terminals on PCs. The video conference terminal A is therefore equipped with means of implementing the method according to the invention, whilst terminal B can simply be a conventional video conference terminal (the terminal TB of B is for example video conference equipment to the H.323 or SIP standard).

It is assumed that, during a video conference communication, the sender A will broadcast a video which he has available on his computer and which he wishes to comment on to his opposite number B.

As long as the sender A has not performed any action from his man/machine interface I in order to broadcast the file which he wishes, the bit-stream which he sends to his opposite number B consists of his image captured by a camera C and then coded and his speech captured by one or more microphones M and coded. The coding standard for the video is for example the H.263 and the coding standard for the speech is for example in compliance with the G.711A standard.

Figure 2:
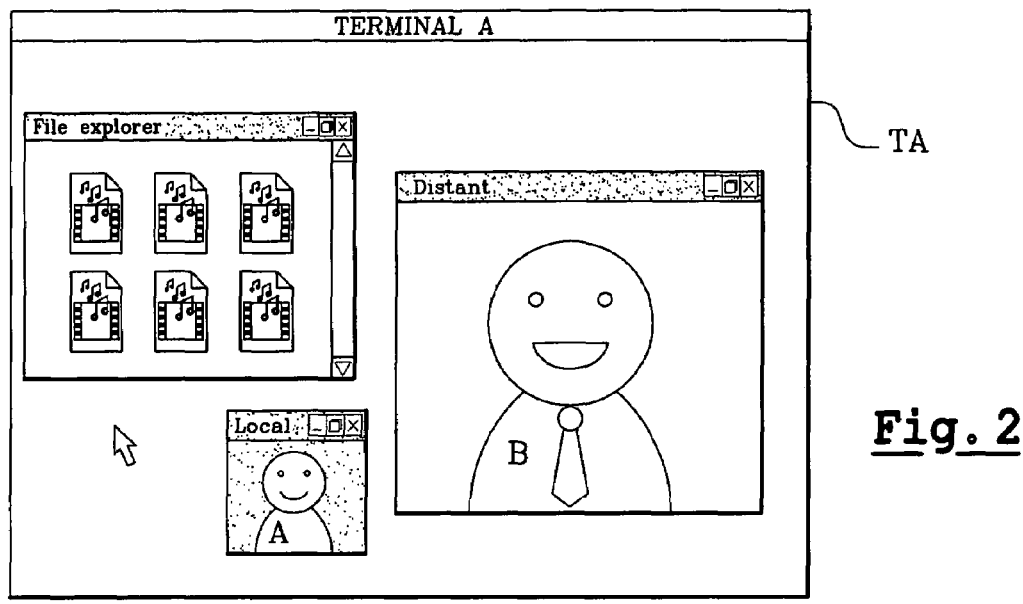
FIG. 2 depicts a view of a video conference terminal TA for the sender A, during a communication.

On the terminal TA, and as can be seen in FIG. 2, three dialogue windows are opened, one entitled "file explorer" revealing, in the form of icons for example, the multimedia files which it has available, the other entitled "distant" consisting of the image received from its opposite number, and the last entitled "local" containing the image which it is transmitting.

Figure 3:
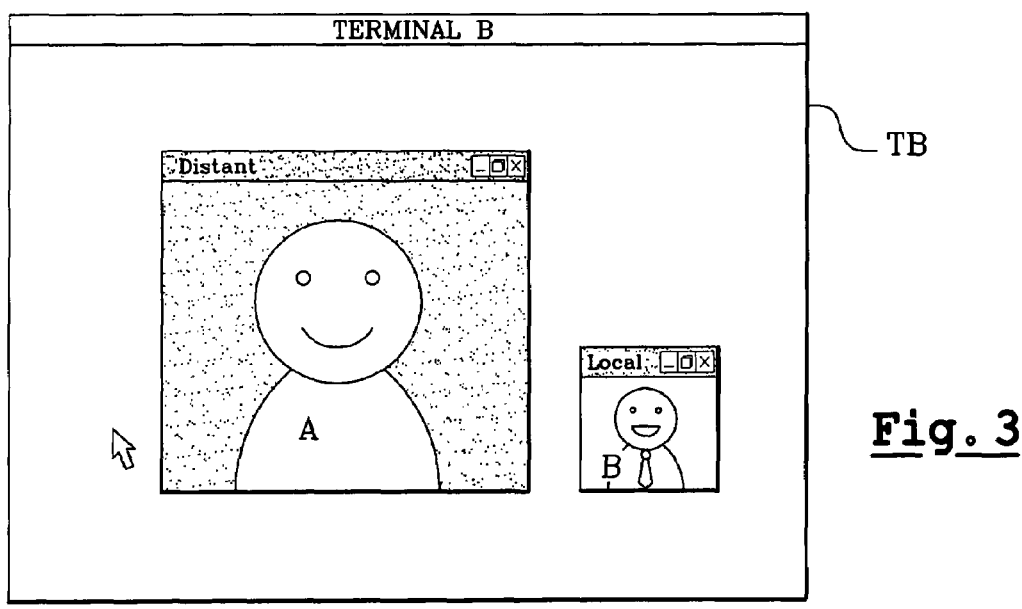
FIG. 3 depicts a view of a video conference terminal TB for the receiver B during a communication.

The diagram in FIG. 3 illustrates the view of the terminal TB for the participant B during the communication. He can see on his screen a "distant" window displaying the image transmitted by the terminal TA, and a "local" window of the image transmitted to A.

When the communication is established, several parameters and constraints between the two terminals are negotiated. This is the case, as will be seen in more detail below, of the size of the frames transmitted (eg 176×144 pixels) the maximum bandwidth used (for example 128 kb/s), the maximum frequency of the frames (for example 15 images per second), and the audio and video coding standards used. The communication protocol used for this negotiation can for example be the H.323 standard.

After negotiation of these parameters, the communication proper begins; during this, the sender decides to broadcast a multimedia file in order to comment on it to his opposite number.

The sender A will for this purpose use the man/machine interface I according to the present invention. In order to understand the remainder reference can be made to the diagram in FIG. 4.

The sender A directs the pointer of the mouse of his computer to the icon of the file which he wishes to broadcast to B, captures it by pressing on the right hand button of the mouse and slides it onto the "distant" window. If he does not deposit the icon on a "distant" window of the terminal, nothing happens and the communication follows its course. If the icon is deposited on one of the windows belonging to the man/machine interface, the broadcast of the multimedia file to the receiver B is commenced.

The operation requires a click and a mouse movement, that is to say a few seconds. The sender A can perform it without his eyes leaving the video conference terminal, and therefore without suspending the communication.

The interface is implemented by the graphical representation means of the terminal and a logic module PROG-F. This logic module is a program which provides the coupling between the operations of selection of a file and movement in the "distant" window and the launch of a programme PROG-D for broadcasting the said file in real time with the current video conference communication, without breaking communication, using the audio and video channels open for this communication.

The broadcast is made under the constraints and conditions negotiated at the initiation of the communication (size of the image, codec (coder-decoder) used, bandwidth), which ensures the correct functioning of the decoding, on the receiver side. In addition, it does not require any renegotiation of the parameters nor opening of new audio and video logic channels, since those opened for the communication are used.

The local image captured by the camera C of the transmitter A is replaced by the video contained in the broadcast file F and an image-in-image insertion of the video of the sender A.

Likewise, the sound coming from the sender A is mixed with the audio data contained in the multimedia file (if such exists), which affords continuity of communication, the visual and audible link between the two participants not being broken.

Figure 4:
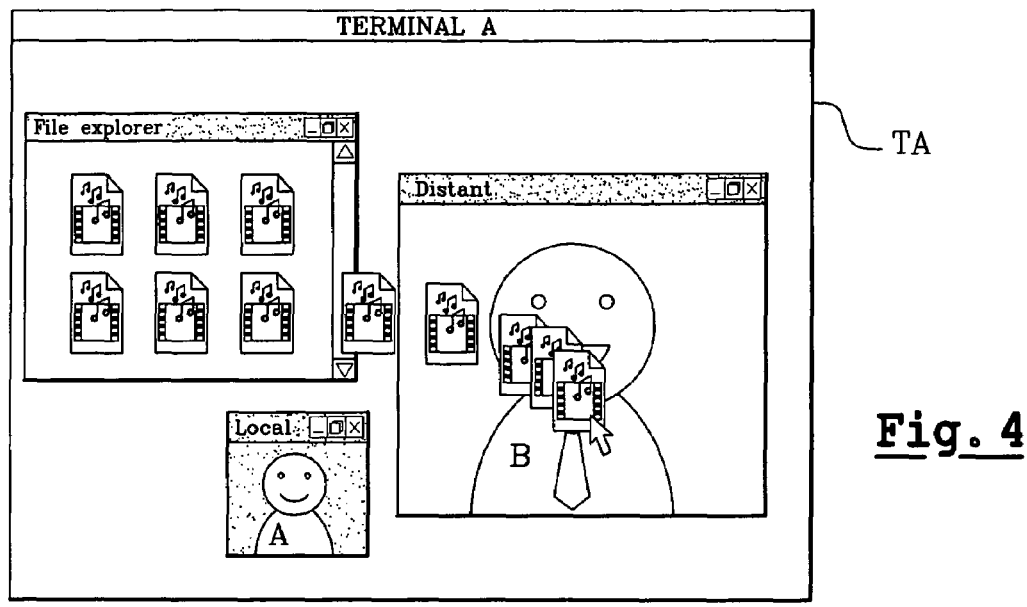
FIG. 4 depicts a view of the video conference terminal TA for the sender A and of the interface I for broadcasting the multimedia file.
Figure 5:
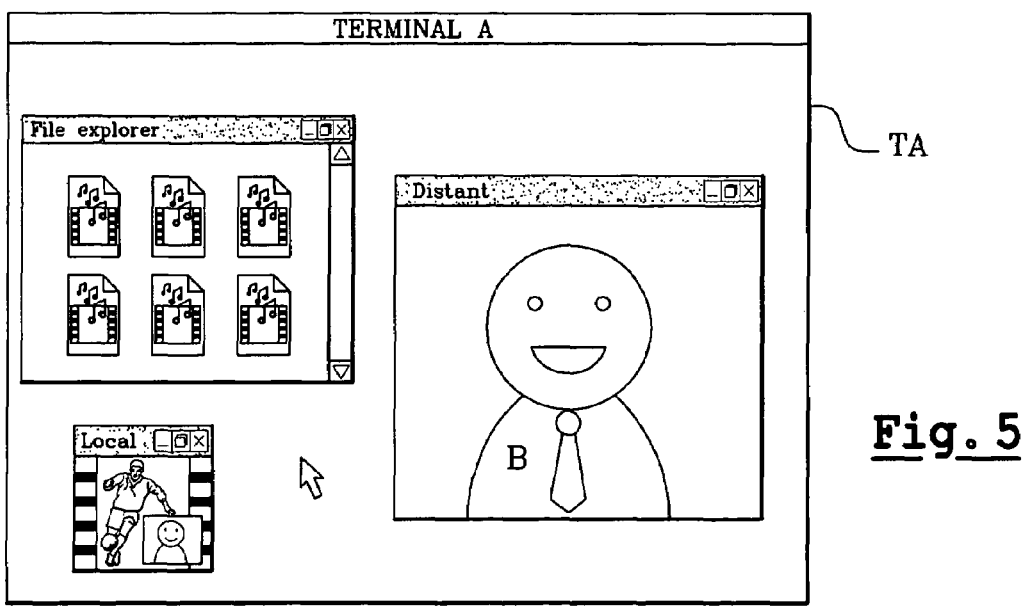
FIG. 5 depicts a view of the video conference terminal TA for the sender A during the broadcast of a file selected by the said sender.
Figure 6:
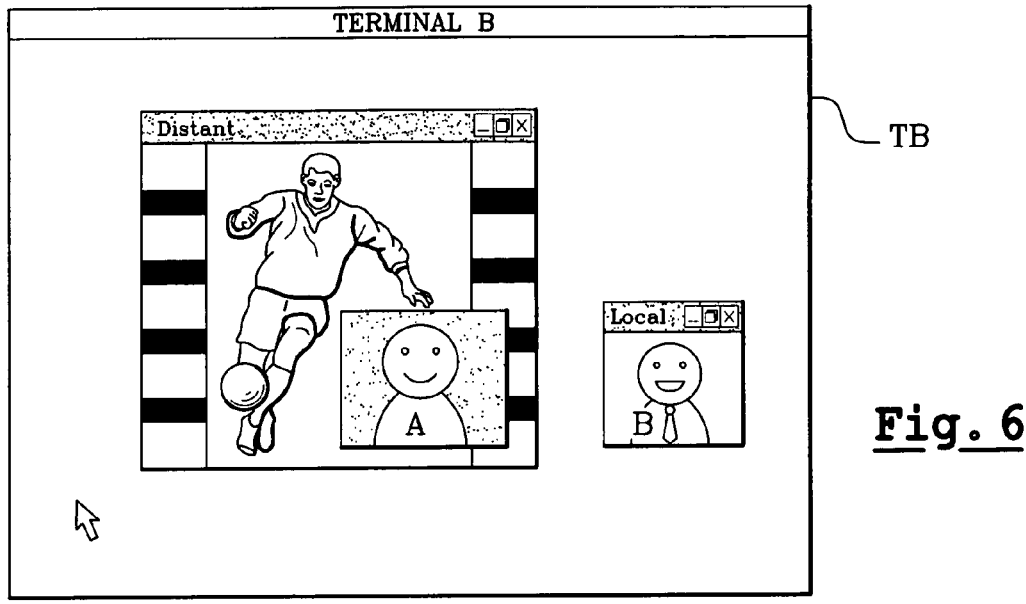
FIG. 6 depicts a view of the video conference terminal TB for the receiver during the broadcast of the multimedia file.

These results can be seen on the "local" window of the display screen of the sender A and on the "distant" window displayed on the screen of the terminal TB, FIGS. 4 and 5.

When the end of the file is reached, the video sent switches onto the locally captured video of the sender A and the video conference continues.

The broadcasting method is implemented by the algorithm illustrated in FIG. 7, which is executed by the program PROG-D produced for this purpose. This algorithm is run during the execution of a computer program produced for this purpose. The execution is activated when the sender A performs the operations of selection of a file and movement in the "distant" window of a participant by means of the program module PROG-F.

This multimedia file broadcast algorithm is implemented on the terminal of the sender A. On the receiver B side, the terminal TB receives data from the network and processes them conventionally as illustrated by the algorithm in FIG. 8.

Its steps are as follows:

10—On establishment of the video conference communication a dialogue between the sending terminal and the receiving terminal or terminals is carried out in order to preferentially negotiate several communication parameters for compliance with the constraints fixed for the said channels, audio and video, and those of the receiving terminals, during the broadcast of a multimedia file.

100—Selection of a multimedia file which the sender A has. These multimedia data files are stored on any medium: hard disk of the terminal TA, diskette or other.

110—Audio data are captured by the audio source (one or more microphones).

120—Video data are captured by the video source (one or more cameras).

200—The data of the multimedia file are processed in order to be transmitted over the network respectively in an audio processing chain 210 and in a video processing chain 220.

300—The data of the audio capture 110 are mixed with the data issuing from the audio processing chain 210 and the data issuing from the video capture 120 are mixed with the data issuing from the video processing chain 220.

400—The audio and video data are coded respectively. A coding 410 to the audio standards adopted for the communication is performed. A coding 420 to the video standards adopted is performed.

500—The data are transmitted over the network using the audio and video logic channels of the video conference.

The audio processing chain 210 comprises the steps of extracting audio data -211, decoding -212, frequency matching -213 and stereo/video matching -214.

The video processing chain 220 comprises the steps of extracting the video data -221, decoding -222, spatial sampling -223 and temporal sampling -224.

All these processing steps are carried out under the following constraints:

Compliance with the bandwidth: the channels used for the broadcast being the logic channels already open for the communication, the audio and video bandwidth measurement mechanisms are always used only before the broadcast. Thus the bandwidth allocated for such and such a channel is never exceeded.

Compliance with the frequencies of the audio and video channels: at the start of the broadcast, the reading and decoding of the multimedia file is commenced. The frequencies of the video and audio streams of the multimedia file may be different from the frequencies negotiated, it is then ensured that the frequencies of the streams captured by the audio and video sources, considered as masters, are complied with. For example, if the frame frequency negotiated during the communication is 15 images per second and the multimedia file is sampled at 30 images per second, only one image out of two of the multimedia file will be broadcast.

Compliance with the frame size: the image resulting from the master stream and slave stream is resized where necessary in order to fit in the size negotiated at the start of the communication.

Compliance with the coding standard:

The coded bit stream sent to the opposite number consists of:

for the video, the mixture (optional), coded according to the codec used during the communication, the unprocessed video captured by the camera and the decoded video of the multimedia file (the real-time image of the sender and the MPEG-1 video of the multimedia file are mixed and coding is carried out with an H.263 codec).

For the audio, a mixture (optional) of the voices of the sender and the sound data of the multimedia file (if such exist), coded according to the codec negotiated for the communication (eg the sounds emitted by the sender are mixed with the audio data of the multimedia file).

Such a mechanism ensures the broadcasting of a multimedia data in the negotiated format of the video conference (audio and video coding standard, bandwidth, etc) and therefore the correct decoding on the receiver side. Thus, in order to assist with the broadcasting, B needs no other equipment than that which he normally uses.

Figure 8:
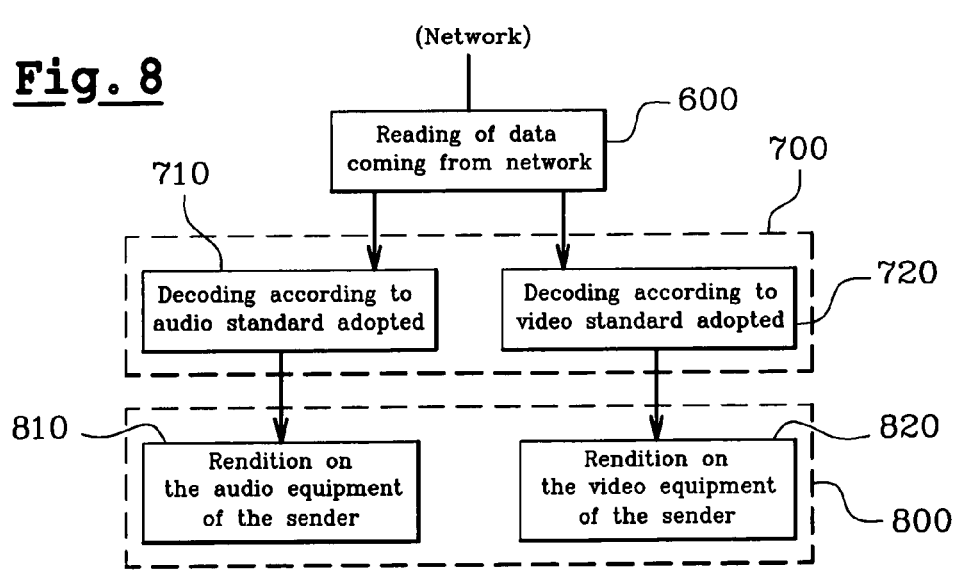
FIG. 8 depicts the reception algorithm for the audio and video signals by a receiving terminal TB.

Reference can be made to the diagram in FIG. 8, which illustrates the decoding algorithm for the data coming from the network on the receiver side, that is to say on the terminal TB side. This algorithm comprises the following steps:
- 600—Reading of the data coming from the network on each logic channel.
- 700—Decoding according to the standards adopted, 710 audio decoding, 720 video decoding.
- 800—Rendition on the equipment of the receiver, 810 rendition on the audio equipment, 820 rendition on the video equipment.

The same means are used as for the video conference, which guarantees for the receiver a correct reading of the audio and video data coming from the sender.

The invention which has just been described consequently concerns an intuitive man/machine interface and the technological tools necessary for the broadcasting of multimedia files in real-time during a video conference. This interface and these broadcast tools afford continuity of communication between the participants, and ensure that all the receivers will be capable of seeing and hearing the files broadcast, whilst complying with the negotiated constraints of the communication (bandwidth constraint, real-time constraints).

This is because, with the present invention, the broadcasting of the multimedia files takes place transparently for the receiver, that is to say he needs no equipment other than that which he uses for the video conference.

The open video and audio logic channels of the communication are used for transmitting the data of the multimedia file mixed (or not mixed if the file has no audio or video data for example) with the data generated by the sender, and then coded with the codes used for the communication. This mechanism ensures the broadcasting of the file to the receiver, and this broadcasting takes place under the same constraints of the communication (real-time, bandwidth never exceeded, etc). Moreover, this broadcasting method is coupled with an intuitive man/machine interface, which requires only a few mouse operations and ensures continuity of the visual and sound link between the participants in the video conference.

The invention claimed is:

1. A method of broadcasting multimedia data files, during a video conference established between a sending device and one or more receiving terminals, these terminals being equipped with audio and video sources, the method comprising negotiating, while the video conference communication is being established between the sending device and said one or more receiving terminals at least one communication parameter including a video coding standard;

mixing in real time in the sending device, the video issuing from a multimedia file with the video issuing from the video capture source, in response to an action performed by a participant via a user interface of said sending device to broadcast said multimedia file;

broadcasting by the sending device, trough the audio and video channels opened for said communication according to the negotiated at least one communication parameter and without disrupting the communication, the mixed video resulting from the mixing and coded according to said video coding standard, in replacement of the video issuing from the video capture source of the sending device, and the audio issuing from the audio source of the sending device.

2. A method of broadcasting files during a video conference according to claim 1, wherein another parameter negotiated is a bandwidth allocated for the audio and video channels of the video conference communication, the multimedia files being broadcast in compliance with the bandwidth.

3. A method of broadcasting files during a video conference according to claim 1, wherein other negotiated parameters include frequencies of the audio and video streams of the streams captured by the audio and video capture sources, the multimedia files being broadcast in compliance with the frequencies.

4. A method of broadcasting files during a video conference according to claim 1, wherein another negotiated parameter is the frame size of the broadcast images, the resulting mixed video issuing from the video capture sources and from a multimedia file complying with the negotiated size.

5. A method of broadcasting files during a video conference according to claim 1, wherein another negotiated parameter is the audio coding standard to be applied to the bit streams of the audio capture sources, the audio bit streams of a multimedia file being coded according to the negotiated audio coding standard.

6. A method of broadcasting files during a video conference according to claim 1, wherein another negotiated parameter is the audio coding standard to be applied to the bit streams of the audio capture sources, the audio data of a multimedia file to be broadcast being mixed in real time with the audio data issuing from the audio capture source of the sending device and then coded according to the negotiated audio coding standard.

7. A method of broadcasting files during a video conference according to claim 1, wherein the broadcasting is implemented by a program whose execution is launched by a user interface of the sending device.

8. A computer device comprising means for implementing a video conference during which the device proceeds with a broadcasting of data files according to claim 1, the device comprising an interface provided with graphical representation means for displaying several windows, including a first window for displaying, during a video conference communication, a video image broadcasted to one or more distant terminals and at least one second window for displaying at least one video image issuing from a distant terminal, wherein said graphical representation means displays at least one other window for revealing multimedia files available from the terminal, said interface also comprising a logic module providing coupling between an operation of selecting a file and of moving in the second window and the launch by the video conference means of a program allowing the broadcast of a selected file in real time with the current video conference communication, without disrupting the communication and by using the audio and video channels opened for this communication.

9. A computer device according to claim 8, wherein the user interface is implemented by a computer program launched by the video conference means.

10. A computer readable storage medium encoded with computer program instruction which when executed by each terminal participating in a video conference, implements the broadcasting method according to any one of claims 1-7 and in that its execution is launched by a man/machine interface located in each terminal.

11. A computer device comprising means for implementing a video conference established between said computer device and one or more receiving terminals, these terminals being equipped with audio and video sources, said computer device comprising means for negotiating, while the video conference communication is being established between said computer device and said one or more receiving terminals, of at least one communication parameter including a video coding standard;

means for mixing in real time the video issuing from a multimedia file with the video issuing from the video capture source, in response to an action performed by a participant by means of a user interface of said computer device so as to broadcast said multimedia file;

means for broadcasting, through the audio and video channels opened for said communication according to the negotiated at least one communication parameter and without disrupting the communication, the mixed video produced by the mixing means and coded according to said video coding standard, in replacement of the video issuing from the video capture source of said computer device, and the audio issuing from the audio source of said computer device.

12. A computer device according to claim 11, wherein another negotiated parameter is the audio coding standard to be applied to the bit streams of the audio capture sources, said computer device comprising means for mixing the audio data of a multimedia file to be broadcast in real time with the audio data issuing from the audio capture source of said computer device, means for coding the mixed audio data according to the negotiated audio coding standard, and means for broadcasting the coded audio data trough the audio channel opened for said communication.

* * * * *